(12) United States Patent
Wilcox et al.

(10) Patent No.: US 10,464,758 B2
(45) Date of Patent: *Nov. 5, 2019

(54) TRANSPORTABLE DRIVE-OVER CONVEYOR SYSTEM

(71) Applicant: AG GROWTH INTERNATIONAL INC., Winnipeg (CA)

(72) Inventors: Brian Wilcox, Rosenort (CA); Dave Friesen, Rosenort (CA); Chris Manning, Rosenort (CA); Ron Braun, Rosenort (CA); Brayden Jaspers, Rosenort (CA)

(73) Assignee: AG GROWTH INTERNATIONAL INC., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,737

(22) Filed: Jun. 16, 2017

(65) Prior Publication Data
US 2017/0283181 A1  Oct. 5, 2017

Related U.S. Application Data

(63) Continuation of application No. 14/032,021, filed on Sep. 19, 2013, now Pat. No. 9,701,481.

(51) Int. Cl.
*B65G 41/00* (2006.01)

(52) U.S. Cl.
CPC ........ *B65G 41/002* (2013.01); *B65G 2207/28* (2013.01)

(58) Field of Classification Search
CPC .................. B65G 41/002; B65G 41/008
See application file for complete search history.

(56) References Cited

U.S. PATENT DOCUMENTS

| | | |
|---|---|---|
| 2,773,586 A | 12/1956 | Schmidtke |
| 4,350,241 A | 9/1982 | Wenzel |
| 4,813,839 A | 3/1989 | Compton |
| 5,964,566 A | 10/1999 | Stewart et al. |
| 6,068,103 A | 5/2000 | Werner |
| 6,966,740 B2 | 11/2005 | Mast et al. |
| 7,090,066 B2 | 8/2006 | Kirsch |
| 7,191,889 B1 | 3/2007 | Heley |
| 7,424,943 B2 | 9/2008 | Gausman et al. |
| 8,584,827 B1 | 11/2013 | Jesse |

(Continued)

FOREIGN PATENT DOCUMENTS

GB  2468966 A  9/2010

OTHER PUBLICATIONS

Office Action for Canadian Patent Application No. 2,827,356, dated Apr. 26, 2016.

(Continued)

*Primary Examiner* — Jonathan Snelting
(74) *Attorney, Agent, or Firm* — Neal, Gerber & Eisenberg LLP

(57) ABSTRACT

A transportable drive-over conveyor system comprising a drive-over hopper for receiving grain or other material and having a belted conveyor for conveying the grain or other material, a transition section pivotally connected at an upstream end to the drive-over hopper, an auger mounted at a downstream end of the transition section, wherein the transition section transfers the grain or other material from the belted conveyor to the auger.

17 Claims, 6 Drawing Sheets

(56) References Cited

U.S. PATENT DOCUMENTS

| | | |
|---|---|---|
| 8,820,515 B2 | 9/2014 | Houssian |
| 9,701,481 B2 * | 7/2017 | Wilcox ............... B65G 41/002 |
| 2003/0170103 A1 | 9/2003 | Mast et al. |

OTHER PUBLICATIONS

Office Action for Canadian Patent Application No. 2,827,356, dated Apr. 30, 2015.
Canadian Intellectual Property Office, Canadian Office Action in Canadian Patent Application No. 2,993,217 (dated Oct. 19, 2018).
Canadian Intellectual Property Office, Canadian Office Action in Canadian Patent Application No. 2,993,217 (dated Feb. 28, 2019).

* cited by examiner

TRANSPORTABLE DRIVE-OVER
CONVEYOR SYSTEM

CROSS-REFERENCE TO RELATED APPLICATIONS

This application is a continuation of U.S. patent application Ser. No. 14/032,021 filed Sep. 19, 2013, which is incorporated herein by reference in its entirety.

TECHNICAL FIELD

The present invention relates generally to grain or other bulk material handling and, more particularly, to augers and conveyors for conveying grain.

BACKGROUND

In the agricultural industry, there are generally two categories of mechanical systems used for conveying grain, the belt conveyor and rotary screw or auger.

Offloading grain from a grain truck or other transport vehicle may be done with a swing-type auger that is swung underneath the grain-storage tank or by driving the truck over a drive-over hopper. Grain is then discharged downwardly onto the drive-over hopper or onto the swing-type auger. Both of these prior-art systems have drawbacks. Swing-type augers are cumbersome and slow to maneuver. Drive-over hoppers typically need to be assembled and moved each time an unloading operation is to be performed.

For example of a drive-over hopper is the PitStop™ drive-over belt conveyor by Batco Manufacturing, a division of Ag Growth International. This is a portable, drive-over, grain-receiving pit-type conveyor for fast unloading of belly-dump trailers.

Another example is the GrainDeck™ drive-over conveyor by Brandt Agricultural Products Ltd.

Although both of these drive-over conveyors provide quick and easy unloading of grain, these separate systems do have some shortcomings. Since these are separate systems, they have to be moved around on their own and cannot be transported as a single unit. It is believed that this also means that it will cost more to buy a separate drive-over conveyor unit and a separate auger. The separate drive-over units are also powered by a separate power source, whether electric or gas motor.

Also known in the industry is the Pit Express™ by Mast Productions Inc. which is an integrated single-unit drive-over auger conveyor. However, this conveyor is moved on its own wheel assembly due to its substantial weight. The drive-over Pit Express auger cannot be folded underneath the main auger for transport such as towing by a truck (i.e. it cannot be lifted and supported by the main auger due to its substantial weight).

In view of the shortcomings of the above-mentioned prior art technologies, an improvement would thus be highly desirable.

SUMMARY

The present invention is directed to a transportable drive-over conveyor system and its method of use in the offloading of grain from a grain truck or other transport vehicle. The transportable drive-over conveyor system in general terms provides a first (drive-over) conveyor that receives grain from the grain truck or other vehicle. The first conveyor, e.g. a belt conveyor, delivers the grain to a second conveyor, e.g. an auger, via a transition section that disposes the downstream end of the first conveyor relative to the second conveyor such that the grain falls from the first conveyor onto the second conveyor.

One inventive aspect of the present disclosure is a transportable drive-over conveyor system comprising a drive-over hopper for receiving grain and having a belted conveyor for conveying the grain, a transition section pivotally connected at an upstream end to the drive-over hopper and an auger mounted at a downstream end of the transition section, wherein the transition section transfers the grain from the belted conveyor to the auger.

Another inventive aspect of the present disclosure is a method of unloading and conveying grain, the method comprising driving a grain truck over a drive-over hopper, receiving grain from the truck into the drive-over hopper, conveying the grain using a belted conveyor to a transition section pivotally connected at an upstream end to the drive-over hopper and mounted at a downstream end to an auger, the transition section elevating and dumping the grain onto the auger for conveying by the auger.

Another inventive aspect of the present disclosure is a material-handling system comprising a first conveyor for receiving and conveying material such as grain, seed, fertilizer or industrial substances or products, the first conveyor having a geometry adapted for driving over, a transition section pivotally connected at an upstream end to the first conveyor, and a second conveyor secured at a downstream end of the transition section, wherein a downstream end of the first conveyor is disposed above an upstream end of the second conveyor to enable material to fall from the first conveyor onto the second conveyor.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
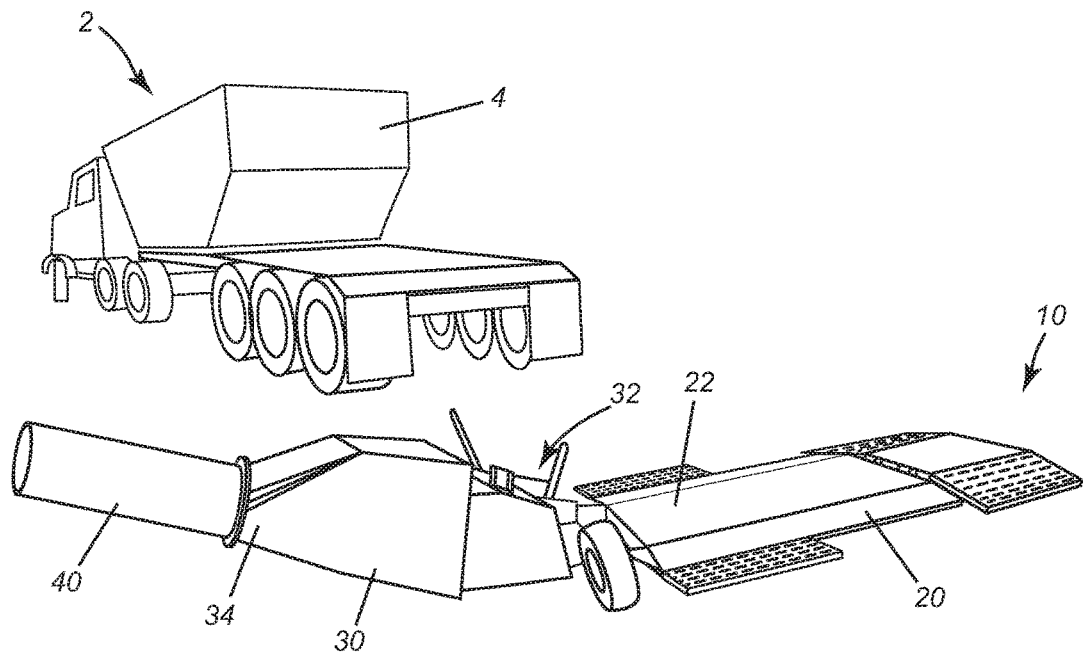
FIG. 1 depicts a grain truck driving over a transportable drive-over conveyor system in accordance with an embodiment of the present invention.

FIG. 1 depicts a grain truck designated generally by reference numeral 2 driving over a transportable drive-over conveyor system 10 in accordance with an embodiment of the present invention. The grain truck has a grain container 4 with a "belly-dump" discharge mechanism for discharging grain downwardly onto the transportable drive-over conveyor system 10 (or simply "conveyor system").

In general, the conveyor system 10 includes a drive-over hopper 20 for receiving grain. The drive-over hopper has a belted conveyor 22 for conveying the grain. The conveyor system 10 also includes a transition section 30 pivotally connected at an upstream end 32 to the drive-over hopper 20. The conveyor system 10 also includes an auger 40 mounted at a downstream end 34 of the transition section 30. The transition section 30 functions to transfer the grain from the belted conveyor 20 to the auger 40. This provides a belt-to-auger (or belt-over-auger) conveyor system.

Figure 2:
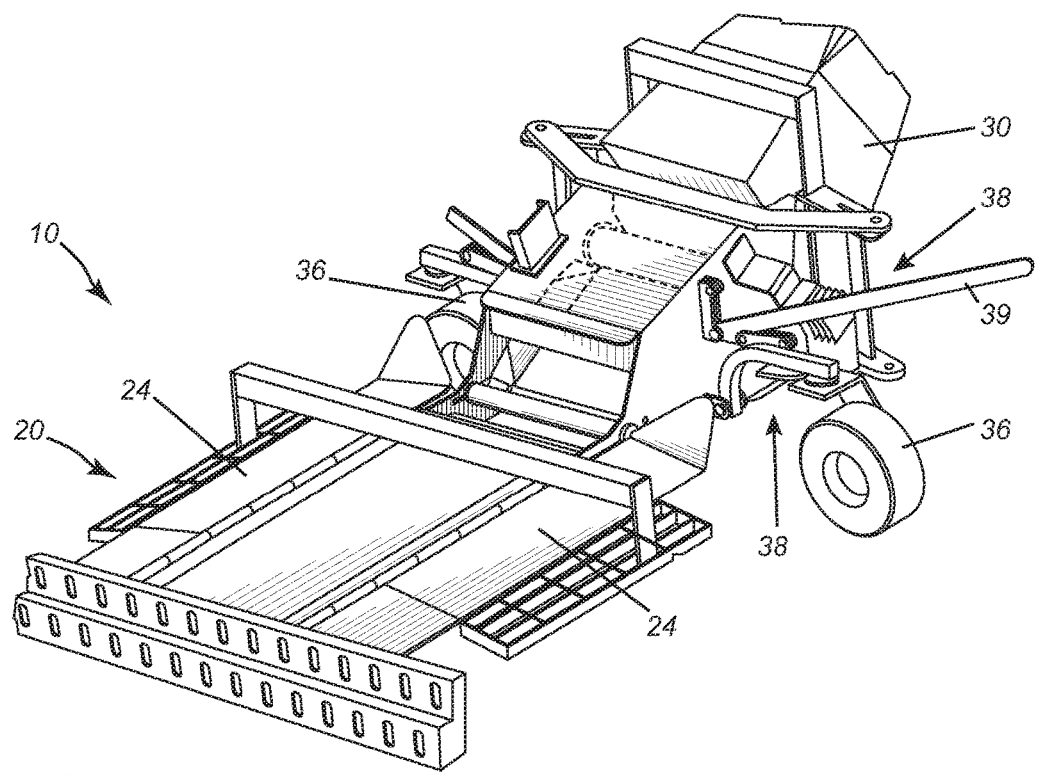
FIG. 2 is an isometric view depicting a caster wheel and associated mechanism used to raise a drive-over hopper of the conveyor system.

FIG. 2 is an isometric view of a portion of the conveyor system 10 showing the drive-over hopper 20 and a portion of the transition section 30. The drive-over hopper 20 has ramps 24 to facilitate the act of driving a truck or other vehicle over the hopper 20. Each ramp 24 has an inclined ramp surface which may be formed of a solid surface, a grating or a combination of both such as shown in the figure. The ramps 24 may be pivotally mounted via hinges or other such rotational mechanism to the hopper top enable the ramps to be folded for transport as will be explained in greater detail below. In the embodiment illustrated by way of example in FIG. 2, the conveyor system 10 comprises a pair of height-adjustable caster wheels 36 mounted to an outer portion of the transition section 30. The caster wheels may be individually raised and lowered by a height-adjusting mechanism 38 that may include a hand-operated lever 39 and mechanical linkages to raise or lower each caster wheel. The height-adjusting mechanism is mounted to the outer portion of the transition section in the illustrated embodiment.

Figure 3:
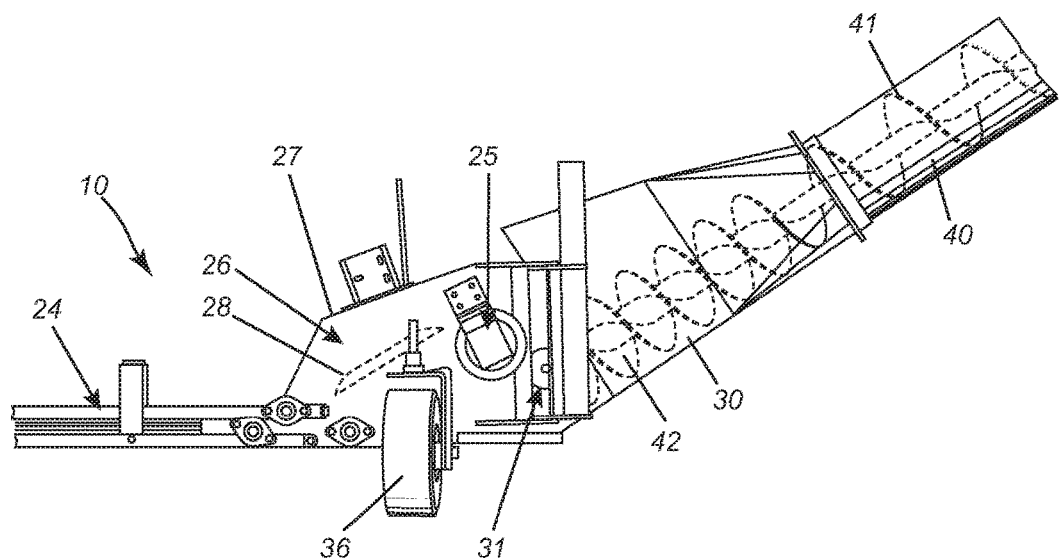
FIG. 3 is a side cutaway view of the conveyor system in accordance with an embodiment of the present invention.

FIG. 3 is a side cutaway view of the conveyor system 10 in accordance with an embodiment of the present invention. In the illustrated embodiment, the belted conveyor 22 is either fixed-angle or adjustable in angle and operates at an angle of up to 25 degrees from a horizontal plane and whereas the auger 40 is also either fixed-angle or adjustable in angle and operates at an angle of up to 45 degrees from the horizontal plane. However, it will be appreciated that in other embodiments, the belted conveyor may operate above 25 degrees and/or the auger may operate above 45 degrees. In this illustrated embodiment, a drive motor 25 is provided for driving the belted conveyor 22. The drive motor 25 may optionally be a hydraulic motor. The drive motor 25 may be mounted with a grain-discharging section 26 of the belted hopper 20. In other words, the hopper 20 includes a flat conveyor belt section 22 followed by a raised or inclined grain-discharging section 26. In the embodiment illustrated by way of example in FIG. 3, the grain-discharging section 26 (also referred to as a belt hopper) includes a housing 27 that accommodates an inclined/ramped belt portion 28 that elevates the grain as the grain travels up the inclined/ramped belt portion 28. Grain is dumped (i.e. poured, cascaded or otherwise transferred) from the downstream end of the inclined/ramped belt portion 28 onto extension flighting 42 of the auger 40. Note how the extension flighting 42 of the auger 40 extends into the transition section 30 from the main flighting 41. In the illustrated embodiment, the extension flighting 42 extending into the transition section is an extension of the main flighting 41. The extension flighting 42 is mechanically coupled or joined to the main flighting 41. Note that the extension flighting and main flighting have different pitches (turns per inch).

Figure 4:
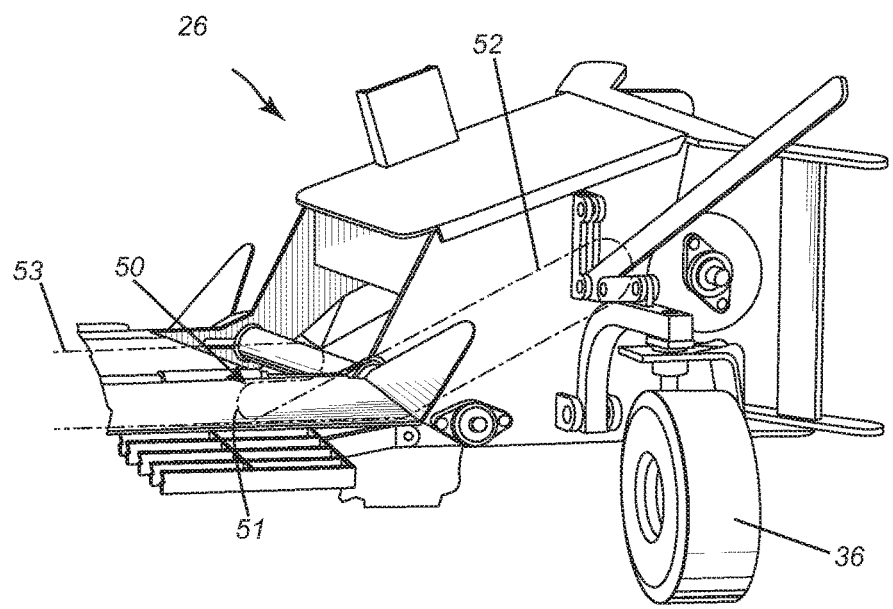
FIG. 4 is an isometric cutaway view of a belted conveyor and connected transition section and further depicting the belt travel path.

FIG. 4 is an isometric cutaway view of a belted hopper (or hopper-type conveyor) and its downstream grain-discharging section 26. FIG. 4 further depicts by way of example the belt travel path 50. The belt travel path 50 in this example configuration defines an S-shaped path 51 followed by an inclined path 52 (corresponding to inclined/ramped belt portion 28) to elevate the grain relative to a lower portion of the flighting of the auger and to dump the grain onto the lower portion of the flighting of the auger (i.e. onto the extension flighting 42). The inclined belt path 52 is inclined relative to the main conveying path 53 (i.e. the path of the belt along the main horizontal (flat) conveying section. The S-shaped path is located at or near the junction of the flat portion of the belt conveyor and the inclined portion 28.

Figure 5:
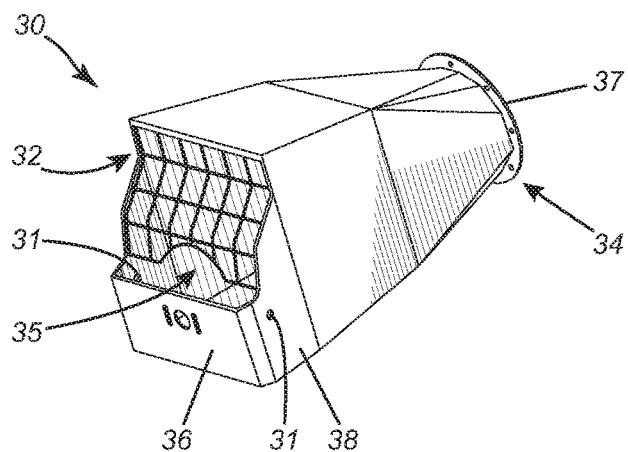
FIG. 5 is an isometric view of the transition section.
Figures 6, 7:
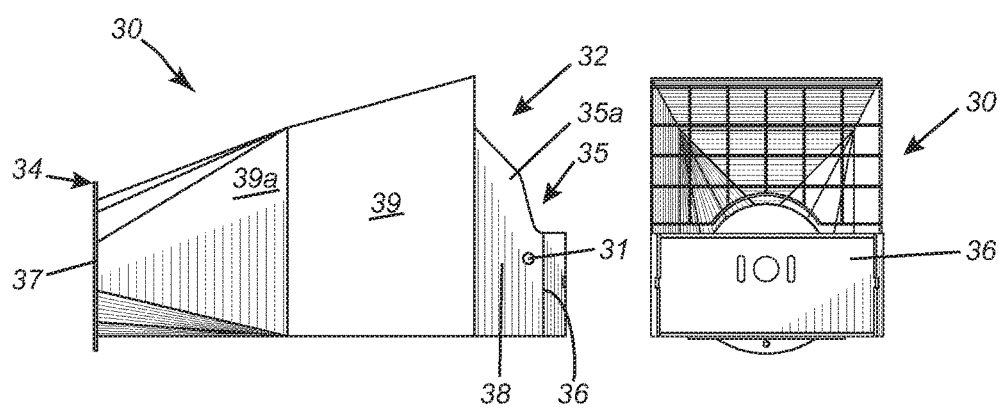
FIG. 6 is a side view of the transition section.
FIG. 7 is a front view of the transition section.

FIGS. 5-7 illustrate the transition section 30 with its upstream end 32 and downstream end 34. The transition section (or "transition") 30 is a key component of the conveyor system 10 because this is where the belted hopper 20 unloads the grain onto the auger 40. The transition section 30 was designed to ensure it could feed the auger at its maximum capacity. During testing, once the transition section 30 was capable of feeding the auger 40 at its maximum capacity then the belt speed was adjusted to match the maximum amount that the transition section 30 and auger 40 could handle. The transition section 30 also provides an attachment point for the belted hopper 20. When the auger angle changes, the angle of the swing tube (i.e. auger 20) relative to the hopper 20 also changes. Therefore, the transition section 30 to the hopper 20 has to be attached to allow for this rotation while still having the belt feed the transition section 30 without spilling.

FIG. 5 is an isometric view of the transition section 30. As shown by way of example in this figure, the transition section 30 comprises an enclosure defining a grain inlet 35 at the upstream end 32, a converging duct 36 and a grain outlet 37 at the downstream end 34.

FIG. 6 is a side view of the transition section 30. As shown by way of example in this figure, the inlet 35 (defining an inlet section 35a) comprises a front lip 36 and angled side walls 38, a first converging section 39, that is higher than the lip and side walls, having a first angle of convergence and a second converging section 39a having a second angle of convergence greater than the first angle of convergence, and wherein the second converging section terminates in a flanged outlet 37 adapted to connect to a swing tube of the auger.

FIG. 7 is a front view of the transition section. The front lip 36 may be a rectangular panel as shown in this figure. In this particular embodiment, the height of the lip represents less than half of the height of the first converging section 39 although this may be different in other embodiments.

Figure 8:
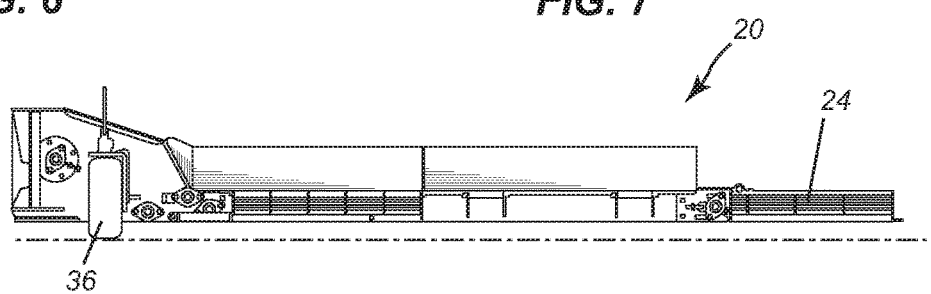
FIG. 8 is a cross-sectional view of the drive-over hopper in a grain-unloading position.

FIG. 8 is a cross-sectional view of the drive-over hopper 20 in a grain-unloading position. The grain-unloading position is the position (and configuration) of the hopper when the grain is being unloaded from a belly-dump truck onto the belt hopper. In the grain-unloading position, the conveyor system is not designed to be moved (either repositioned relative to the truck or grain bin or to be transported to another site). As shown by way of example in FIG. 8, in this configuration, the ramp 24 is deployed (unfolded) to permit a truck to drive over the drive-over hopper 20. The caster wheel 36 is also raised in this configuration.

Figure 9:
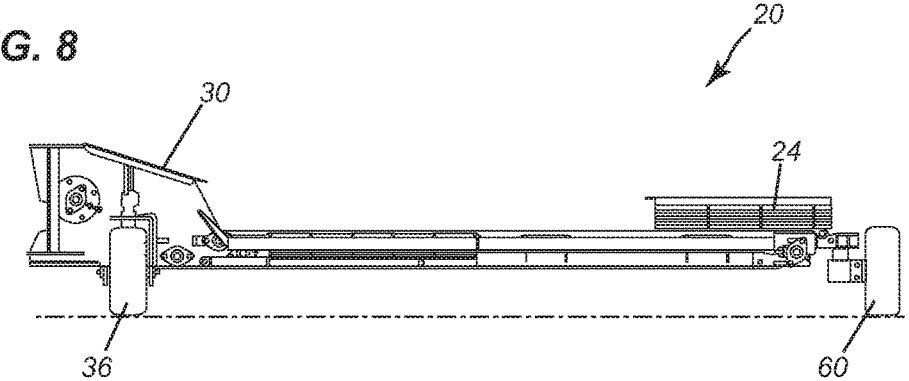
FIG. 9 is a cross-sectional view of the drive-over hopper in a drive position.

FIG. 9 is a cross-sectional view of the drive-over hopper 20 in a drive position. The drive position is the position and configuration for driving, moving or repositioning the hopper. In the drive position, the conveyor system is not designed to unload grain. As shown by way of example in FIG. 9, in this configuration, the ramp 24 is folded onto the drive-over hopper 20. The caster wheel 36 is also lowered (fully deployed) in this configuration. A drive wheel 60 (or, more generally, a drive wheel subsystem) may be attached to the drive-over hopper 20 as will be explained in greater detail below with respect to FIG. 12. This drive wheel 60 enables the conveyor system 10 to travel in an arc to be deployed (unfolded) or folded. Depending on whether the hopper 20 is locked or pinned (i.e. connected) to the transition section 30, the hopper 20 will travel one of two different arcs.

Figure 10:
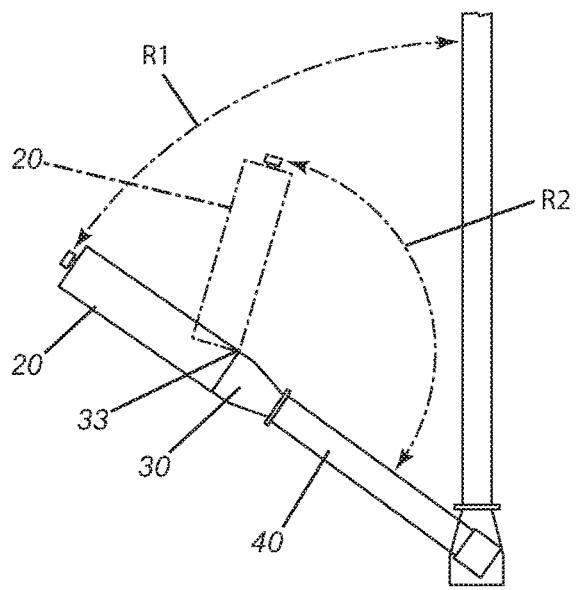
FIG. 10 depicts a first radius R1 for the hopper when the hopper is locked to the transition section and a second radius R2 for when the hopper is unlocked from the transition section.

FIG. 10 depicts a first radius R1 for the hopper 20 when the hopper 20 is locked (e.g. pinned) to the transition section 30 and a second radius R2 for when the hopper 20 is unlocked (e.g. unpinned) from the transition section 30. When unlocked, the hopper 20 pivots relative to the transition section about pivot point 33. This is a lockable pivot which, in one embodiment, may be locked or unlocked by inserting or removing a locking pin. The hopper may be folded by driving the drive wheel 60 to fold the hopper relative to the transition and auger. The drive wheel also is used to unfold the hopper (by reversing direction). When pinned together the drive wheel also drives the entire conveyor system 10 including the hopper 20, transition 30 and auger 40.

In one embodiment, in which the side of the transition section is flush with the side of the hopper 20, the drive-over hopper 20 pivots (about a substantially vertical axis) relative to the transition section 30 to fold 180 degrees relative to the transition section 30 and the connected auger 40. In other variations, the folding angle may be greater or less than 180 degrees.

Figure 11:
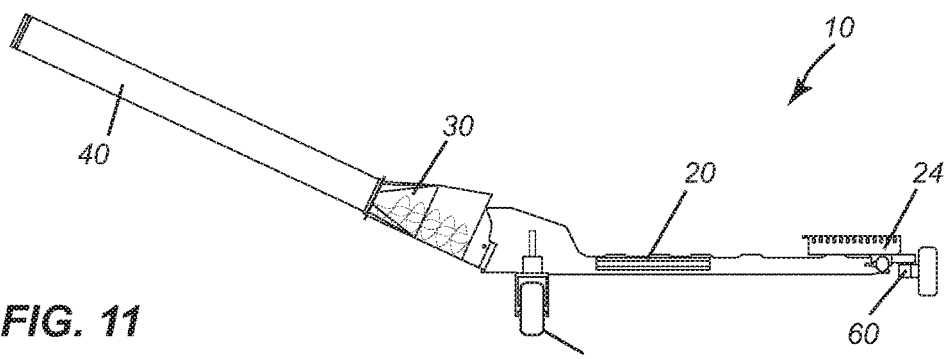
FIG. 11 is a cross-sectional view of the conveyor system in the drive position.

FIG. 11 is a cross-sectional view of the conveyor system 10 in the drive position (or drive configuration), i.e. with the caster wheel 36 deployed and the drive wheel 60 attached. Note that the ramp 24 is folded onto the belted hopper 20 in this configuration.

Figure 12:
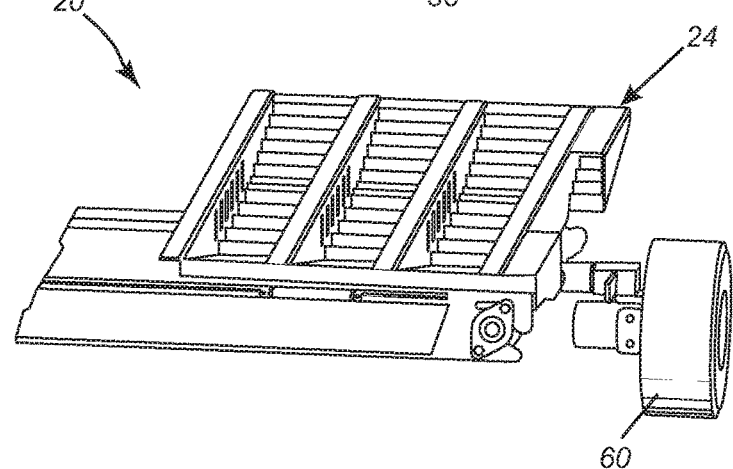
FIG. 12 is an isometric view of a drive-over hopper showing the foldable ramp and detachable drive wheel.

FIG. 12 is an isometric view of the drive-over hopper 20 showing the foldable ramp 24 and the detachable drive wheel 60. The drive wheel 60 may be a hydraulic drive wheel in this one exemplary embodiment although other drive wheel subsystems may be employed. In this embodiment, the axis of the drive wheel 60 is substantially parallel to a general direction of grain travel on the top belt of the belted hopper.

For repositioning, the drive wheel 60 is attached and the ramp 24 raised and folded onto the belted hopper 20. This figure depicts a foldable ramp 24 that pivotally unfolds to provide an inclined ramp surface and pivotally folds onto the onto the hopper for transport. In this embodiment, the ramp 24 folds about an axis that is perpendicular to a direction of conveyance. The single detachable hydraulic drive wheel 60 is only attachable to the system (belted hopper) when the ramp 24 is folded onto the hopper for transport. The folding ramp 24 in this illustrated embodiment is a flip-over ramp. The flip-over ramp 24 may be flipped (i.e. rotated or pivoted) about an axis of rotation that is orthogonal (perpendicular) to the general direction of grain travel on the top belt of the belted hopper. When flipped up onto the hopper, there is room to attach the wheel 60; otherwise, when the ramp is down, the ramp physically blocks attachment of the wheel. Likewise, when the wheel is attached, the ramp cannot physically be lowered. The interaction between the wheel and ramp thus provides a failsafe mechanism to ensure that the conveyor can only be moved when the ramp is up and the wheel attached and, conversely, that grain can only be unloaded when the ramp is down and the drive wheel detached. The configuration of the ramp (up versus down) visually signals to the unloading crew and/or truck driver whether or not the conveyor system is currently configured for unloading grain.

Figure 12A:
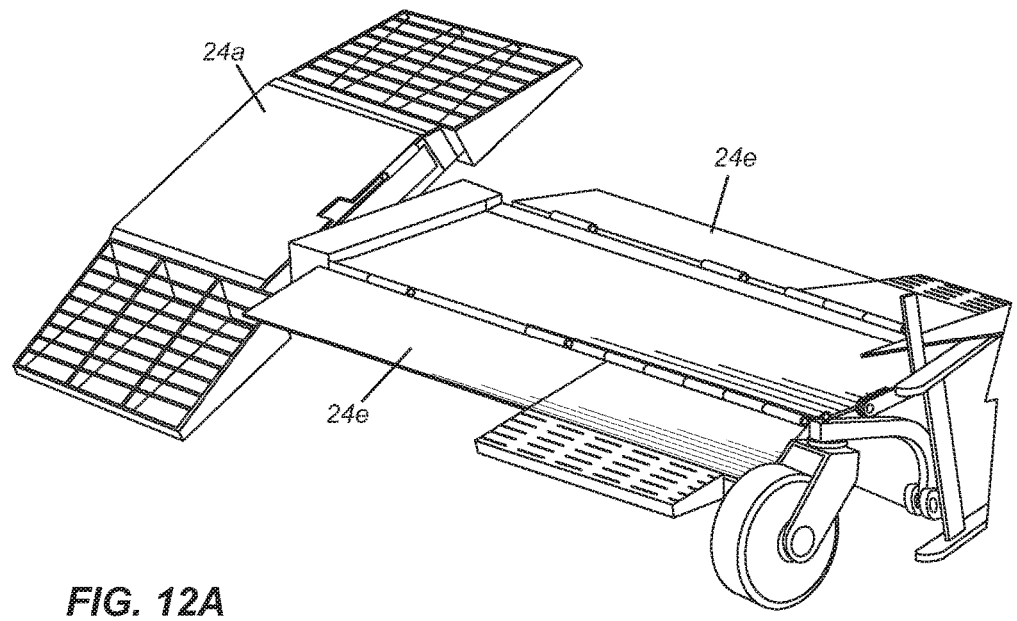
FIG. 12A is an isometric view of a variant of the foldable ramp having a universal-type joint to reduce the moments transferred to the conveyor body when placed on irregular or soft ground.
Figure 12B:
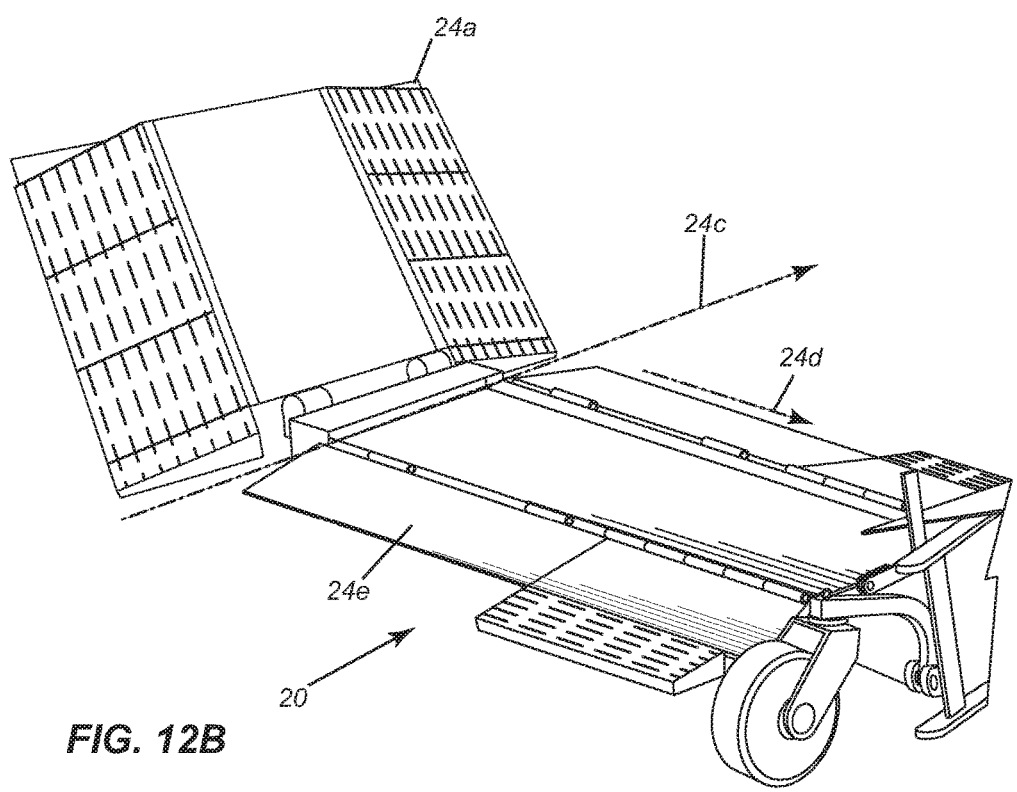
FIG. 12B is another isometric view of the foldable ramp in folded onto the belted hopper.
Figure 12C:
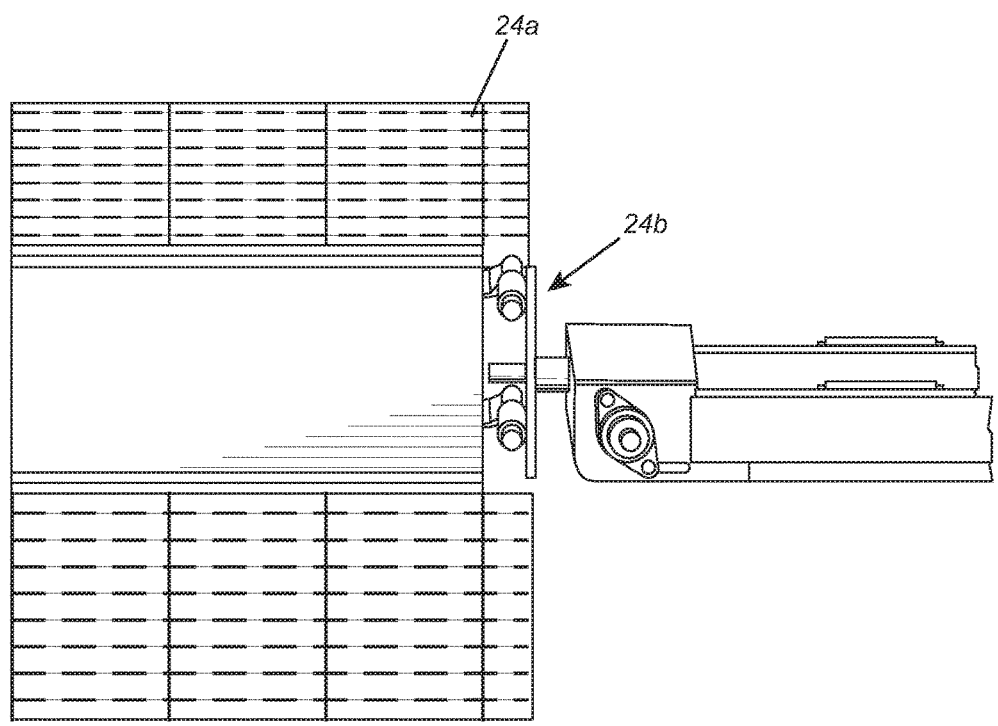
FIG. 12C is another isometric view of the foldable ramp showing the universal-type joint.

FIG. 12A is an isometric view of a variant of the foldable ramp 24A having a universal-type joint to reduce the moments transferred to the conveyor body when placed on irregular or soft ground. In other words, this universally-jointed ramp 24A eliminates or at least substantially reduces the twist or torsion on the frame of the conveyor system when the truck drives over the ramp 24A on uneven or irregular ground. FIG. 12B shows the foldable ramp 24A being folded about an axis perpendicular to a direction of conveyance. FIG. 12C is another isometric view of the foldable ramp 24A showing the universal-type joint 24B. With reference to FIG. 12B, The axis about which the ramp folds onto the belted 20 is denoted by 24C. The axis 24C is perpendicular to the direction of material conveyance which is denoted by 24D. The ramp can thus pivot about the axis 24C but also about an axis parallel to the axis of conveyance 24D. With reference to FIG. 12A and FIG. 12B, the ramp 24A also includes hinged flaps 24E. These flaps 24E are raised for transport and lowered for unloading.

The conveyor system disclosed in this specification is thus a single (fully integrated) system that combines both technologies (belt conveyor and screw auger) into one single integral apparatus or machine. The belted drive-over hopper dumps the grain onto the flighting to be carried upwardly by the auger. The belt hopper is powered by a hydraulic motor that may receive its power supply from the hydraulic output of a tractor or other equivalent source. The rotational power is supplied from the power takeoff (PTO) output of the tractor. Therefore, all the flighting is powered from the PTO and the belt is powered hydraulically. The two separate power systems both originate from the same source (which is usually a tractor).

One novel aspect of the invention is that the belted drive-over hopper is attached to the auger (i.e. swing tube of a regular rotary screw auger). Therefore, the apparatus is one single unit that can be transported in one piece. Prior-art drive-over hoppers are separate units that unload into the main auger.

A tremendous benefit of having a belted system that attaches directly to the main auger is that the system can be transported as one single piece of equipment. It can be deployed with ease when setting up at a bin site for unloading. The drive-over portion can remain flat on the ground and the auger transition will pivot about the belted hopper when raising or lowering the auger.

This conveyor system has a low profile drive-over hopper that is attached to the main auger in order to constitute a single (integral) piece of equipment. Westfield Industries, a division of Ag Growth International, currently has a drive-over hopper designed with flighting. The flighting requires a minimum height and therefore the ramps have to be longer to enable the truck to drive over the top of the structure enclosing the flighting. The present design is much less bulky, lighter and easier to move around. This low-profile drive-over belted hopper is small and light enough to transport with the auger. Because of the belted conveyor, the hopper in this illustrated embodiment is only 4½" (11.4 cm) in height. This compact design (low height) means that the ramps leading to the hopper are substantially smaller and lighter than in the prior art. The deck height of the Brandt conveyor mentioned above is 5¾" (14.6 cm) which is 1¼" (3.2 cm) higher than the present design. This means that the ramps would have to be extended out further making the whole unit wider and heavier and would not be able to be attached to the auger as one unit. The Batco conveyor is also much bigger and heavier than the present design and would also not be attachable to an auger as a single unit. The PitStop has a 7½" (19 cm) clearance height and is 8' (2.5 m) wide which is much larger than the present design.

The inventors have moreover recognized that a further technical hurdle arises in designing a means for attaching a belted hopper to a screw auger to have a single integrated apparatus or machine. In the embodiments disclosed herein, the belt utilizes rollers in an S-configuration in order to transition the belt from a substantially horizontal position to an incline in order unload the product (e.g. grain) into the new transition from above. The new auger transition provides a pivot point (denoted by reference numeral 31 in FIGS. 3, 5 and 6) to which the belted hopper is connected so that, when the auger is raised, the flighting and belt remain in close contact to minimize wasted product (i.e. product that does not transfer from the belt portion to the auger swing tube).

The drive-over concept is designed to decrease the amount of time it takes to unload product from the truck/trailer, which is crucial in the grain industry. With the increasing popularity of trailers with underside discharge chutes (e.g. Wilson Trailer Company Pacesetter Super-B), the main slowdown is lining up each trailer with the hopper. The drive-over concept allows the hopper to be positioned permanently for each bin and the truckers do not have to worry about moving the hopper under the truck each time they come to unload.

The belted drive-over hopper provides a compact, lightweight and low profile design that is conducive for trucks driving over the hopper (without being too bulky or heavy for transport).

This new concept of transferring grain from the belt conveyor to the auger as a single mechanical system employs two newly designed components that attach to the auger's swing tube. As depicted in FIG. 11, these are the belted hopper 20 and the transition section 30 (or transition box or simply "transition").

As mentioned above with respect to FIG. 8 and FIG. 9, the belted hopper 20 has two different configurations. FIG. 8 shows by way of example the hopper in the auger position or unloading position with the ramp 24 deployed and caster wheels 36 raised. In the unloading configuration, the ramp 24 has to be lowered for a truck to drive over the hopper 20. To move or drive/reposition the conveyor to a new location, the end ramp must be folded up and the caster wheels locked down. The drive wheel 60 may then be re-attached for the drive configuration shown by way of example in FIG. 9. It is also then ready for transport by utilizing the hydraulic drive wheel to power the system to its transport position.

The conveyor system 10 can be been folded into the transport position. In the transport position, the hopper 20 folds underneath the auger 40. The conveyor system 10 is light enough and compact enough to be towed by a pickup truck.

Other Embodiments

The inventive concepts disclosed herein may be applied to other material-handling systems. Materials may include other agricultural products, like seeds, fertilizer, or other such bulk materials, or may include other products or substances in other industrial applications. The belted conveyor disclosed in the illustrated embodiment may be replaced with a low-profile drive-over auger or the auger may be replaced with replaced with a belted conveyor. Thus, the conveyor system may be belt-belt, belt-auger (as illustrated), auger-belt or auger-auger. Therefore, in broad terms, a material-handling system includes a first conveyor for receiving and conveying material, the first conveyor having a geometry adapted for driving over, a transition section pivotally connected at an upstream end to the first conveyor, and a second conveyor secured at a downstream end of the transition section, wherein a downstream end of the first conveyor is disposed above an upstream end of the second conveyor to enable material to fall from the first conveyor onto the second conveyor. The first conveyor may optionally be pivoted about a substantially vertical axis relative to the transition section to fold 180 degrees relative to the transition section and the second conveyor. Optionally, the system includes a height-adjustable caster wheel mounted to the transition section. Optionally, the system includes a single detachable hydraulic drive wheel that is only attachable to the system when the ramp is folded onto the hopper for transport. Optionally, the system includes a foldable ramp that pivotally unfolds to provide an inclined ramp surface and pivotally folds onto the first conveyor for transport.

The main implementation of the material-handling system is the illustrated embodiment disclosed above which the first conveyor is a belted conveyor whereas the second conveyor is an auger. In one specific embodiment, the belted conveyor is operable at an angle of up to 25 degrees from a horizontal plane whereas the auger is operable at an angle of up to 45 degrees from the horizontal plane. In that illustrated embodiment, and as described above, the first conveyor has a belt travel path that defines an S-shaped path followed by an inclined path to elevate the material relative to a lower portion of a flighting of the auger and to dump the material onto the lower portion of the flighting of the auger. The system may also fold into a transportable position by folding the first conveyor underneath the second conveyor. In other words, the system folds as a single integrated unit for transport.

Method

The novel conveyor system also enables a novel method of unloading and conveying grain or other material. For unloading grain, this method entails driving a grain truck over a drive-over hopper, receiving grain from the truck into the drive-over hopper and conveying the grain using a belted conveyor to a transition section pivotally connected at an upstream end to the drive-over hopper and mounted at a downstream end to an auger. The transition section elevates and dumps the grain onto the auger for conveying by the auger. In one embodiment, the method further comprises pivotally unfolding a ramp to provide an inclined ramp surface for the truck to drive over the drive-over hopper and, after unloading is complete, pivotally folding the ramp onto the hopper for transport. In one embodiment, the method further comprises attaching a single detachable hydraulic drive wheel that is only attachable when the ramp has been folded onto the hopper for transport. In one embodiment, the method further comprises unfolding the drive-over hopper 180 degrees relative to the transition section for unloading and then, after unloading is complete, folding the drive-over hopper 180 degrees relative to the transition section for transport. As noted above, in other variations, the folding angle may be greater or less than 180 degrees. An analogous method may be performed for unloading other material, substances or products with similar or analogous physical characteristics.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A drive-over conveyor system comprising:
   a drive-over hopper for receiving grain and having a belted conveyor for conveying the grain such that the grain is conveyed along a direction of conveyance;
   a transition section at a downstream end of the drive-over hopper wherein the belted conveyor is angled upwardly in the transition section; and
   a swing auger at a downstream end of the transition section,
   wherein the belted conveyor extends in the transition section to transfer the grain from the belted conveyor to the swing auger;
   a drive motor disposed at the transition section to drive the belted conveyor.

2. The system of claim 1 further comprising a drive wheel connectable to the drive-over hopper to swing the drive-over hopper and swing auger about a vertical axis.

3. The system of claim 1 wherein the drive-over hopper is pivotable relative to the transition section about a pivot axis parallel to a vertical axis.

4. The system of claim 3 comprising a lockable pivot to enable the hopper, when the lockable pivot is unlocked, to fold relative to the transition section wherein the lockable pivot, when locked, maintains the hopper aligned with the transition section.

5. The system of claim 1 wherein the drive wheel is a detachable hydraulic drive wheel.

6. The system of claim 1 wherein the belted conveyor comprises an S-shaped path.

7. The system of claim 1 wherein the belted conveyor defines an S-shaped path at a junction of a flat portion of the conveyor and an inclined portion of the belted conveyor.

8. A drive-over conveyor system comprising:
   a drive-over hopper having ramps enabling a vehicle to drive over the hopper in a drive-over direction and to dump a bulk material into the hopper, wherein the hopper includes a belted conveyor for conveying the bulk material along a direction of conveyance orthogonal to the drive-over direction;
   a swing auger downstream of the drive-over hopper;
   a transition section connecting the drive-over hopper to the swing auger wherein the belted conveyor is angled upwardly in the transition section; and
   a drive motor disposed at the transition section to drive the belted conveyor.

9. The system of claim 8 further comprising a drive wheel to swing the drive-over hopper and swing auger about a vertical axis.

10. The system of claim 8 wherein the drive-over conveyor is pivotable relative to the transition section about a pivot axis parallel to a vertical axis.

11. The system of claim 8 comprising a lockable pivot to enable the hopper, when the lockable pivot is unlocked, to fold relative to the transition section and wherein the lockable pivot, when locked, maintains the hopper aligned with the transition section.

12. The system of claim 8 wherein the drive wheel is a detachable hydraulic drive wheel.

13. A drive-over conveyor system comprising:
   a drive-over hopper for receiving grain and having a belted conveyor for conveying the grain wherein the belted conveyor includes a horizontal belt path defining a direction of conveyance;
   a transition section at a downstream end of the drive-over hopper wherein the belted conveyor is angled upwardly in the transition section to define an inclined belt path that is angled relative to the horizontal belt path;
   a swing auger at a downstream end of the transition section, wherein the belted conveyor transfers the grain from the inclined belt path to the swing auger;
   a driver motor disposed at the transition section for driving the belted conveyer; and
   a drive wheel for driving the drive-over hopper.

14. The system of claim 13 further comprising a caster wheel mounted to the transition section and wherein the drive wheel swings the drive-over hopper and swing auger about a vertical axis.

15. The system of claim 13 wherein the drive-over conveyor is pivotable relative to the transition section about a pivot axis parallel to a vertical axis.

16. The system of claim 15 comprising a lockable pivot to enable the hopper, when the lockable pivot is unlocked, to fold relative to the transition section wherein the lockable pivot, when locked, maintains the hopper aligned with the transition section.

17. The system of claim 13 wherein the drive wheel is a detachable hydraulic drive wheel.

* * * * *

UNITED STATES PATENT AND TRADEMARK OFFICE
CERTIFICATE OF CORRECTION

PATENT NO. : 10,464,758 B2
APPLICATION NO. : 15/625737
DATED : November 5, 2019
INVENTOR(S) : Wilcox et al.

Page 1 of 1

It is certified that error appears in the above-identified patent and that said Letters Patent is hereby corrected as shown below:

In the Claims

Column 10, Line 40, "driver" should be "drive"

Signed and Sealed this
Eighteenth Day of February, 2020

Andrei Iancu
*Director of the United States Patent and Trademark Office*